United States Patent
Blotky et al.

(10) Patent No.: US 6,762,734 B2
(45) Date of Patent: *Jul. 13, 2004

(54) CONTAINER WITH MEANS FOR DISPLAYING STILL AND MOVING IMAGES

(76) Inventors: Randolph M. Blotky, 249 Tigertail Rd., Los Angeles, CA (US) 90049; John H. Dargan, 1264 Via Landeta, Palos Verdes Estates, CA (US) 90274; Gregory B. Thagard, 1120 Granville, #302, Los Angeles, CA (US) 90049

( * ) Notice: Subject to any disclaimer, the term of this patent is extended or adjusted under 35 U.S.C. 154(b) by 236 days.

This patent is subject to a terminal disclaimer.

(21) Appl. No.: 09/882,163

(22) Filed: Jun. 15, 2001

(65) Prior Publication Data

US 2002/0190869 A1 Dec. 19, 2002

(51) Int. Cl.[7] .................................. G09G 3/12
(52) U.S. Cl. .................. 345/45; 345/76; 345/102; 40/324; 40/554; 362/101
(58) Field of Search .................. 345/36, 45, 76, 345/5, 102, 204; 340/69.1, 691.4, 691.6, 692, 693.8, 815.53, 815.66, 815.73, 384.7, 815.69; 40/324, 554; 362/84, 101; 206/459.1

(56) References Cited

U.S. PATENT DOCUMENTS 5,852,590 A * 12/1998 de la Huerga ................ 368/10
6,084,526 A * 7/2000 Blotky et al. ............ 340/691.6

* cited by examiner

*Primary Examiner*—Bipin Shalwala
*Assistant Examiner*—Ricardo Osorio
(74) *Attorney, Agent, or Firm*—Gottlieb, Rackman & Reisman, P.C.

(57) ABSTRACT

A container for a beverage or other foods or household goods includes a wall with a display generating digital images). A controller is also provided associated with a memory, said memory storing digital imaging data. The controller selectively retrieves the data from the memory and generates electrical signals to the display. Data may also be transmitted from or received by the container through an external interface controlled by the controller. Switches, sensors and other selector elements may be provided to activate the display and to select the images to be shown. Additionally, miniature speakers may also be provided which cooperate with the display to show multimedia presentations.

16 Claims, 4 Drawing Sheets

CONTAINER WITH MEANS FOR DISPLAYING STILL AND MOVING IMAGES

BACKGROUND OF THE INVENTION

A. Field of Invention

This invention pertains to beverage cans as well as containers for foodstuff, household goods, and other products having various images provided on their outside surfaces. More particularly, the present invention pertains to containers such as metallic cans, boxes and the like, which are provided with an electronic display for showing images thereon, including for example, still or moving color images related to the contents of the container, other products made by the same manufacturer, or even unrelated subject matter.

B. Description of the Prior Art

Beverage containers such as cans are typically formed with a cylindrical sidewall and two circular ends made of sheet metal. Typically, the sidewall is provided with a colorful label identifying the manufacturer and the contents of the can. The label is printed on the sidewall of the container itself, or on a paper or plastic sleeve which is then attached to the can. Sometimes, additional information is provided on the ends as well.

A major function of the label on beverage containers is to attract the attention of the customer. The label can be a powerful advertising means that can increase sales and revenues. Therefore, manufacturers compete to make beverage and other containers very colorful and striking to attract as much attention as possible.

OBJECTIVES AND SUMMARY OF THE INVENTION

An objective of the present invention is to provide an improved beverage container with a display disposed on a container sidewall that can selectively and dynamically show a plurality of electronic images.

A further objective is to provide a beverage container associated control circuitry that includes an external interface that can be used to transfer data to and from the container.

Other objectives and advantages of the invention will become apparent from the following description of the invention.

Briefly, a beverage container constructed in accordance with this invention includes a tubular sidewall and two end walls cooperating to form a closed, water and airtight enclosure for a liquid. A sleeve is mounted around the tubular wall. The sleeve includes a display arranged to show images, including color images, in response to electrical signals generated by a control circuit. The control circuit is mounted on the beverage container as well and includes a memory storing imaging data, a microprocessor and a driver receiving commands from the microprocessor and generating the electrical signals for the display. The control circuit further includes sensors coupled to the microprocessor for sensing a predetermined condition. These sensors include a manual switch and/or other elements that detect ambient light or the opening of the container. The microprocessor is responsive to signals from the sensors and activates the display or modifies the images on the display in some manner. The control circuit also controls an external interface that can be used for transferring data to and from the container. The external interphase may comprise a wired or a wireless connection and may be used to exchange data with the outside world, such as an external data source. A battery is also provided for powering the control circuit and the display.

Optionally, small speakers may also be provided on the container.

The control circuit is adapted to generate on the display still images or moving images, or, if provided with speakers, may provide a multimedia presentation combining the images with sounds.

DETAILED DESCRIPTION OF THE INVENTION

Figure 1:
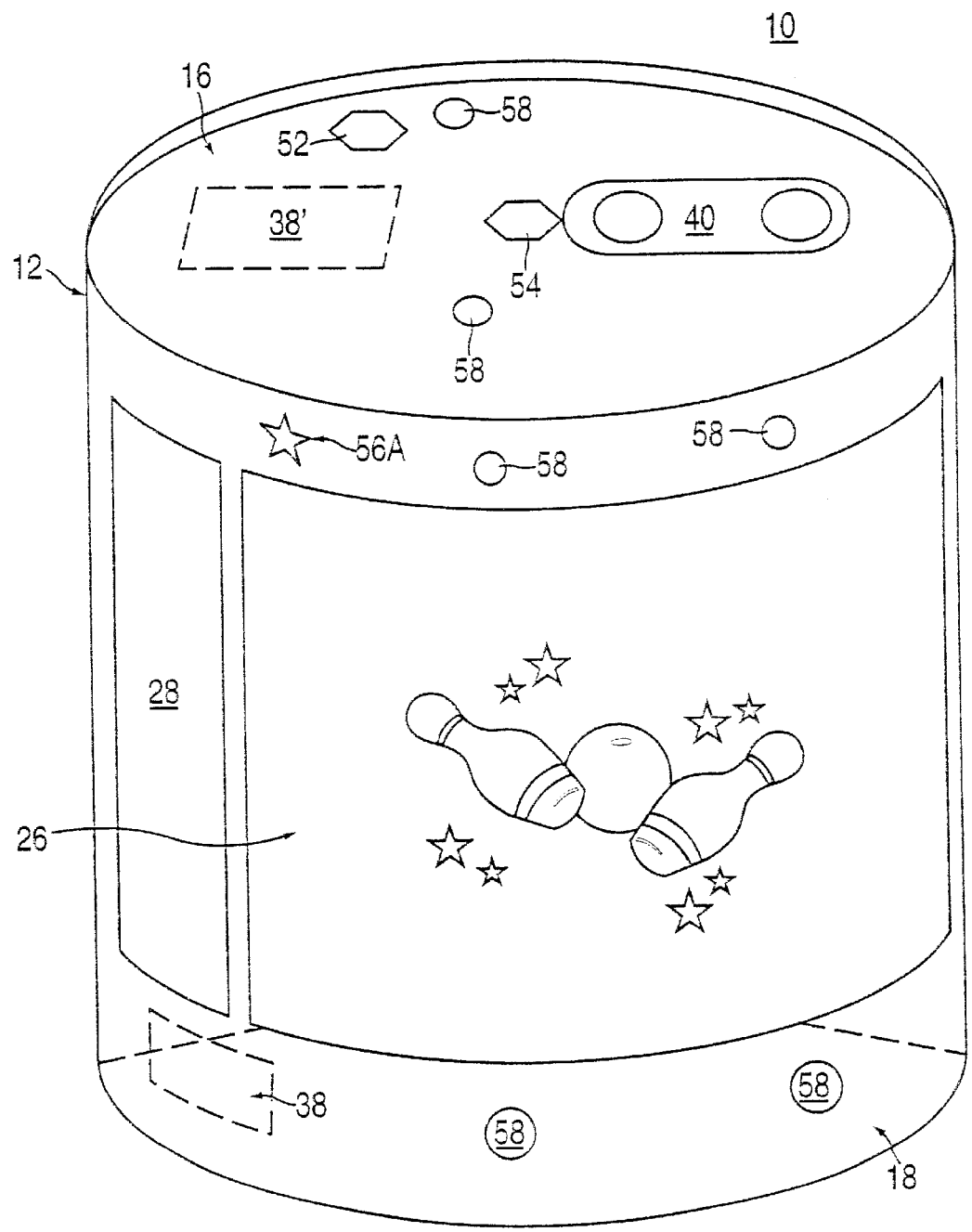
FIG. 1 shows a perspective view of a beverage container with a sleeve having a display constructed in accordance with this invention.

Referring now to FIGS. 1–4, a beverage container 10 constructed in accordance with this invention consists of a body 12 having a cylindrical sidewall 14, a top end wall 16 and a bottom end wall 18. The bottom end wall 18 is usually bowed inwardly leaving a concave space under the container 10. Disposed around the sidewall 14 is a sleeve 20.

Figure 2:
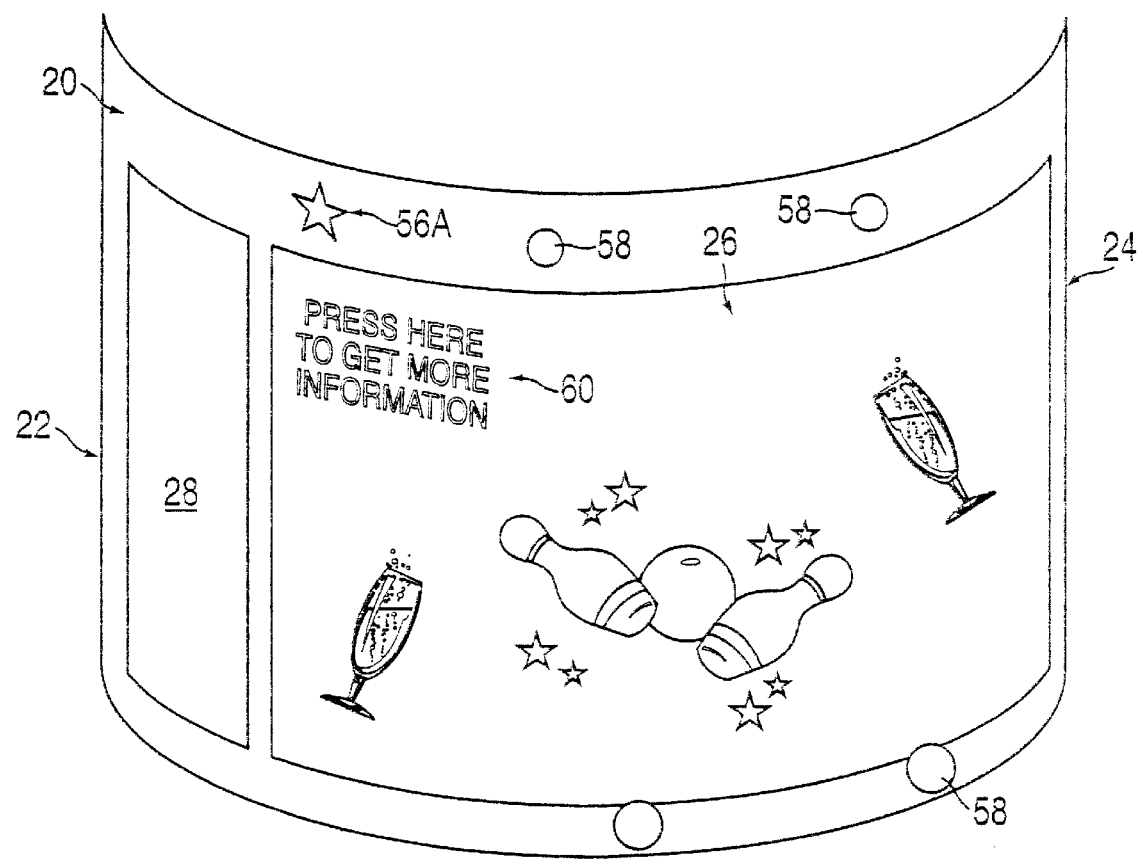
FIG. 2 shows a developed view of the sleeve of FIG. 1.

As shown in FIG. 2, the sleeve 20 has two ends 22, 24 that are joined seamlessly when slipped over body 12. A display 26 is formed on the sleeve 20. Preferably the display 26 is made of a flexible material such as light emitting polymer (LEP) available from Cambridge Display Technology of Cambridge, U.K. Between display 26 and one end 22, the sleeve 20 may be provided with a zone 28. This zone (as well as a zone adjacent to end 24, not shown) may be reserved for standard printed matter containing the identification of the manufacturer, the contents of the container 10 and so on. This printed matter is provided in case the display 26 fails. Alternatively, the display 26 may extend continuously all around the body 12 and the printed matter may be provided on either the top wall 16 or the bottom wall 18.

Figure 3:
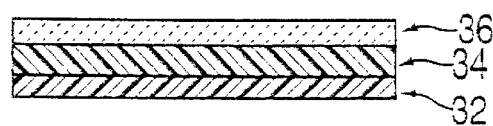
FIG. 3 shows a cross-sectional view of the sleeve of FIGS. 1 and 2.

As shown in FIG. 3, the display 26 is preferably composed of three layers: a plastic base 32 which is used to provide strength and dimensional stability to the sleeve 20, the LEP layer 34 (including the associated drive conductors), and a protective layer 36. The protective layer 36 is also made of a plastic material and is transparent or at least translucent so that the images formed by the LEP are clearly visible.

A control circuit together with a battery is incorporated into a case 38 disposed, for instance, in the space formed by the bottom wall 18, or on top wall 16 as shown in FIG. 1 at 38'.

Figure 4:
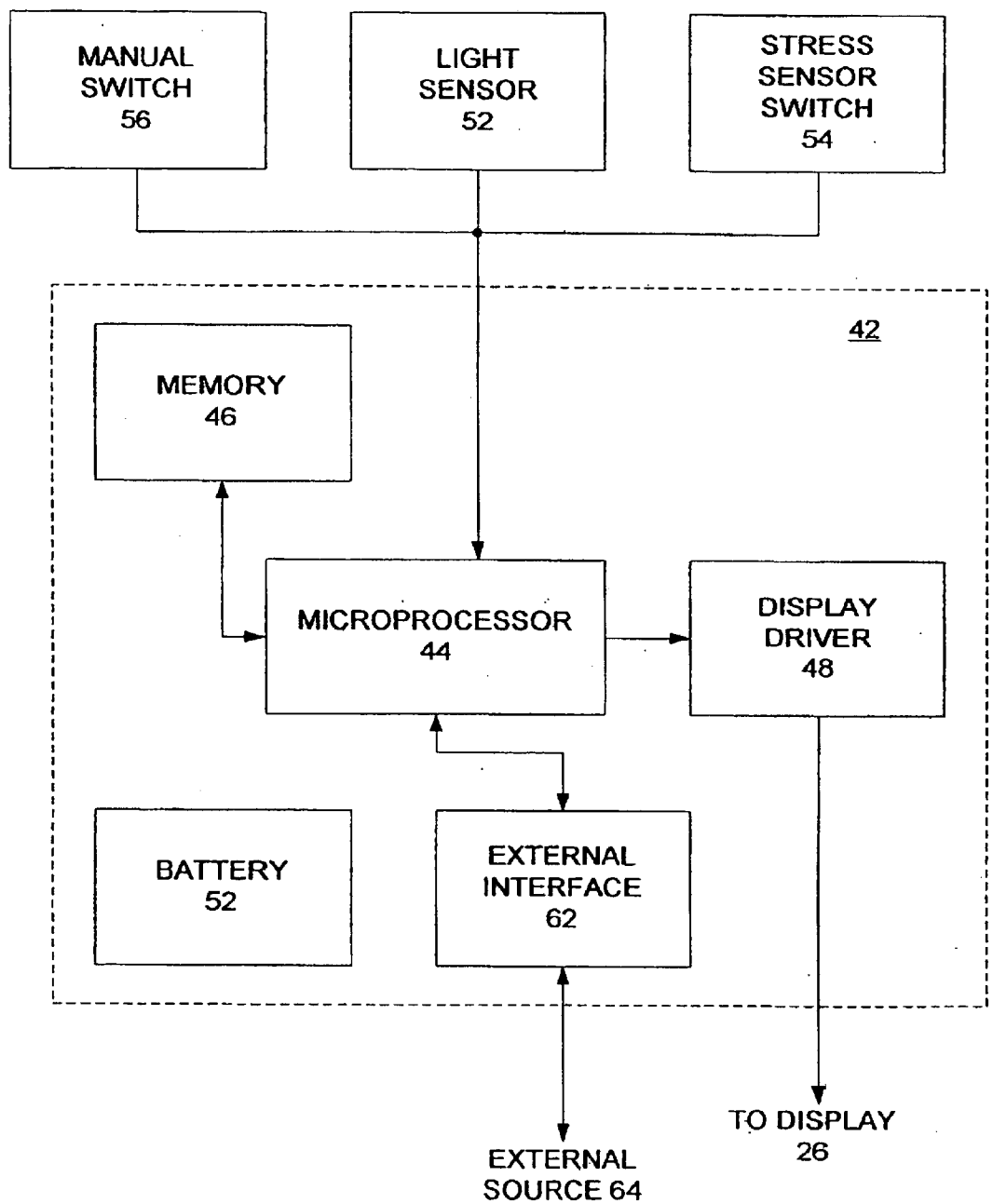
FIG. 4 shows a block diagram of the control circuit associated with the display incorporated into the sleeve shown in FIGS. 1–3.

Referring now to FIG. 4, the control circuit 42 includes a microprocessor 44, a memory 46, an external interface 62 and a display driver 48. The memory 46 is used to store digital data for various images. The microprocessor 44 retrieves this data and uses the same to generate commands to the display driver 48. The display driver 48 generates electrical signals in response to the commands from the microprocessor 44. These electrical signals are sent to display 26. Power to the control circuit 42 is provided by a battery 52.

Also associated with the control circuit 42 are three sensors 52, 54, 56. These sensors detect when certain predetermined conditions exist as described below.

When the container 10 is disposed in a closed box for shipping, or inside a refrigerator, there is no need for any images to be generated and accordingly the display may be turned off to save energy thereby extending the life of battery 50. Sensor 52 comprises a light detector. As soon as it detects light, it sends a corresponding signal to microprocessor 44. The microprocessor 44 is then primed to show images on the display 26 as discussed more fully below.

As seen in FIG. 1, top wall 16 of container 10 is provided with a closing tab 40. This tab 40 is removed or lifted by a customer to open the container 10. If the container 10 is pressurized, for example, if it holds beer or soda, its body 12 undergoes a slight distortion when the tab 40 is opened. Sensor 54 could be a stress sensor (for example, a piezoelectric transducer) which detects a flexure of body 12. Alternatively, the sensor 54 may be a standard miniature switch which senses when tab 40 is opened or removed. In response to the opening of the tab 40, the sensor 54 sends a corresponding signal to the microprocessor 44.

Sensor 56 may comprise an activating switch 56A such as a mechanical switch which may be selectively activated by a customer. The switch 56A may be attached to the sleeve 20, as shown in FIGS. 1 and 2. Alternatively, the sensor 56 may be a touch sensitive sensor embedded into the sleeve which is activated when a customer lifts the container. For example, the touch sensitive sensor may overlap the zone 28 shown in FIG. 2.

To improve the dynamic nature of the container 10, image, sound or other data may be transferred between it and an external source 64. For this purpose, an external interface 62 is provided which may be, for example, a serial or parallel port, an IR, RF coupler, or other similar hard-wired coupling. Alternatively, the interface 62 could be a wireless modem capable of exchanging data with the external source 64 over an Intranet- or Internet-based network.

The transfer of data may be automatic or it may be triggered, for example by an appropriate sensor such as sensors 52, 54, 56 or by activating another switch provided for this purpose. The addition of the external interface could serve multiple purposes. For example, a user can generate an image or sound file on his computer (not shown), or download it, for example from the Internet, and then transmit it to the microprocessor 44 via interface 62. The interface 62 can then store this file in the memory 46. Similarly, data could be transferred from the container 10 to an external source 62 in response to an advertisement displayed on the container 10 activated by an appropriate sensor such as the stress sensor 54.

The container 10 may also be provided with several piezoelectric or ceramic speakers 58. These speakers 58 may be disposed on the sleeve 20 and/or on the top wall 16 as shown. Alternatively, the speakers may be provided in the form of a sheath (not shown) incorporated into sleeve 20.

The display 26 comprises a number of pixel elements depending, for example, on the size of the container 10. Even for a large container, a display of 480.times.640 pixels may be sufficient. If memory 46 has a storage capacity of 10 M bytes, and if data compression is used, it can hold data for up to five hundred color images for the display 26. Alternatively, instead of pixels, the display 26 may comprise several discrete image elements having distinct shapes, the image elements being selectively activated by the microprocessor 44. The images can be shown one at a time, or may be displayed in a rapid succession to generate moving images. These moving images may be accompanied by appropriate sounds from the speaker 58.

Figure 5:
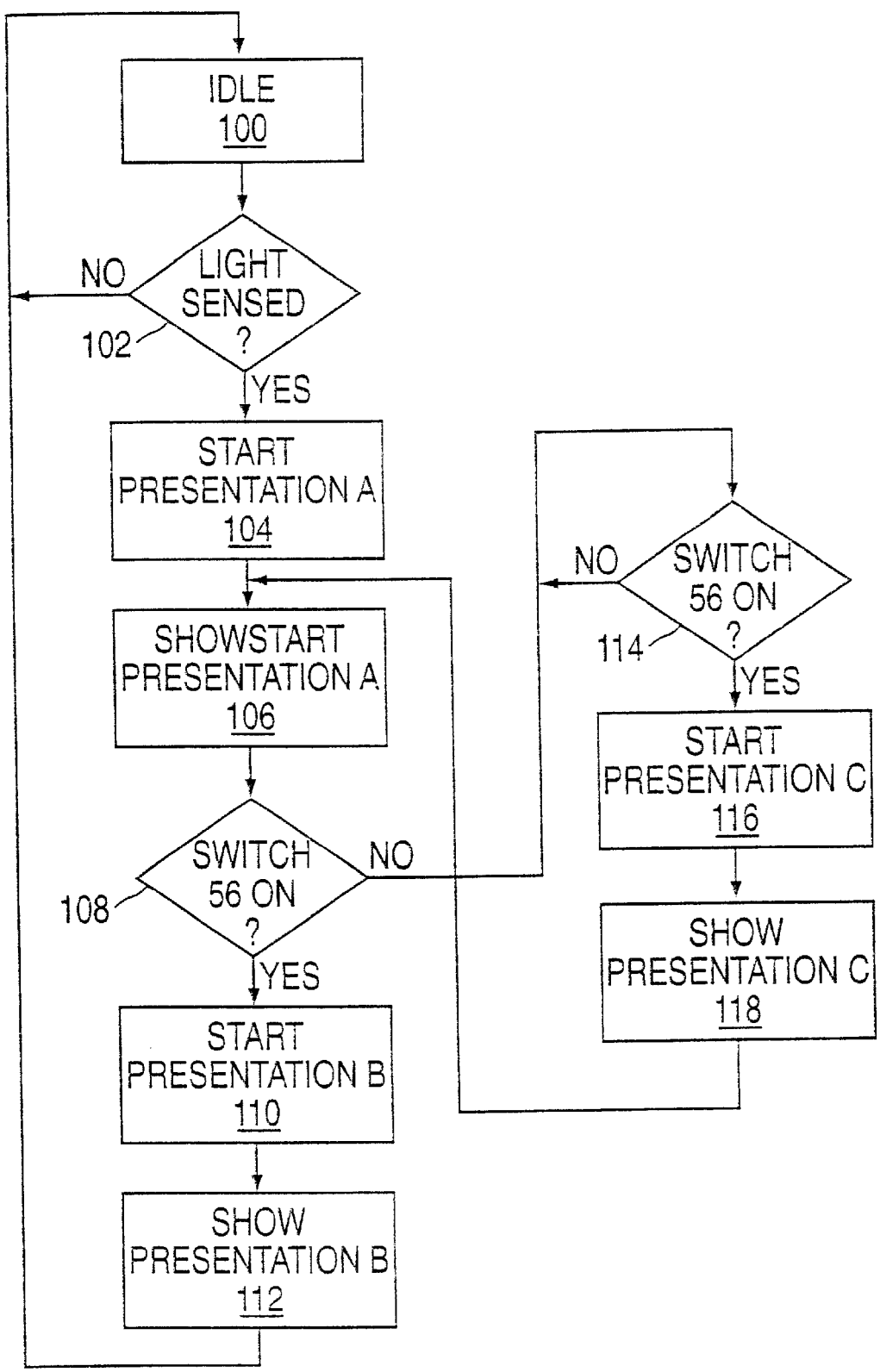
FIG. 5 shows a flow chart for showing several (for example, three) visual and/or multi-media presentations using the display and its circuitry shown in FIGS. 1–4.

A typical operation for a container 10 is now described in conjunction with FIG. 5. In this Figure, initially, the control circuit 42 is in an idle mode (step 100). In this mode the light sensor 52 is monitored (step 102). If light is sensed, it is assumed that the container has been placed on a shelf in a store and accordingly, a preselected presentation A, consisting, for example, of a plurality of images shown in succession is started in step 104. In step 106 the presentation A continues to be played until one of several events take place. Alternatively, presentations may be delayed until one of these events occurs.

In step 108 a check is performed to determine if sensor 56 has been activated, by a customer or potential customer. For example, adjacent to switch 56A, a sign (which may be presented by display 26 at 60) may be provided with the legend 'PRESS HERE TO GET MORE INFORMATION' If the sensor 56 is a touch sensitive switch, it is automatically activated when the container is lifted, as discussed above.

Returning to FIG. 5, in step 108, if the sensor 56 is activated then in step 110 the data for a second presentation B is retrieved from the memory 46 and is shown in step 112 on display 26. Presentation B may provide further information about the beverage in container 10. Alternatively, in response to the activation of sensor 56, a different unrelated presentation may be shown. For example, the legend may indicate that a presentation is available regarding a coming movie attraction. At the end of presentation B, the system recycles to step 100.

If in step 108 it is determined that sensor 56 has not been activated, then in step 114 a check is performed to determine if sensor 54 has been activated, indicating that the container 10 has been opened. If in step 114 the sensor 54 has been activated, then in step 116 the data for a third presentation C is retrieved from the memory 46 and shown by display 26 in step 118. This third presentation C may be related to other products made by the same company or promotional data informing the customer of prizes, goods or services associated with the sale of the container 10. Alternatively, the third presentation C may concern an unrelated product or service. At the end of the third presentation C, the system may recycle to step 100. Some, or all the presentations A, B, and C may be multimedia presentations consisting of still or moving images combined with sounds emitted from speakers 58.

If in step 114 it is determined that sensor 54 has not been activated then the system returns to step 106 and continues displaying the first presentation A.

The mode of operation described in FIG. 5 is presented merely as an illustration of the flexibility of the system. The number of presentations, their content and length is limited only by the information storage capability of the memory 46. Obviously many different types of presentations and modes of operations can be stored and sequenced as well. Moreover, other types of sensors may be added and some or all of the sensors 52, 54, 56 may be omitted.

The subject invention has been described in association with a beverage container. One skilled in the art will appreciate that with little or no modification the invention may also be used to show still pictures, moving pictures, or multimedia presentations on various other types of containers as well, such as plastic or glass bottles, cardboard or plastic boxes and other containers used for packaging and dispensing various foods, household and any other types of products.

Numerous modifications may be made to the subject invention without departing from its scope. The present embodiments are therefore to be considered in all aspects as illustrative and not restrictive in any manner.

We claim:

1. A beverage container comprising:
   a body for holding liquid beverage defined by a tubular sidewall and two end walls to form a sealed enclosure;
   a sleeve disposed about said sidewall, said sleeve including a display;
   a memory storing imaging data;
   an external interface; and
   a controller coupled to said memory, said external interface and said display, said controller being arranged to selectively retrieve said imaging data from said memory to generate signals for said display to cause said display to show images corresponding to said imaging data and to exchange data through said external interface.

2. The container of claim 1 further comprising a sensor coupled to said controller and provided to sense a predetermined condition, said controller being arranged to transmit or receive data in the presence of said condition using said external interface.

3. The container of claim 2 wherein said sensor is responsive to the presence of ambient light.

4. The container of claim 2 wherein said sensor comprises a manual switch.

5. The container of claim 2 wherein said sensor is responsive to the opening of said enclosure.

6. A container used for storing a product comprising:
   a housing arranged to form a sealed enclosure for holding the product, said housing including at least a sidewall;
   a display supported on said sidewall and responsive to electrical signals to generate an image;
   a memory storing digital imaging data;
   an external interface adapted to receive and transmit data between said memory and the outside world; and
   a controller coupled to said memory and said display to selectively retrieve said imaging data and to generate said electrical signals.

7. The container of claim 6 wherein said display is made of a flexible material to conform to the shape of said sidewall.

8. The container of claim 6 wherein said sidewall has a curved shape and said display conforms to said curved shape.

9. The container of claim 6 wherein said display comprises a light emitting polymer material.

10. The container of claim 6 further comprising a sound reproducing element supported on said housing and coupled to said controller, said sound reproducing element and said display cooperating to produce a multimedia presentation formed of still or moving images and sounds.

11. The container of claim 6 further comprising a sensor mounted on said housing, said sensor being arranged to sense a predetermined condition and to provide a corresponding indication to said controller, and said controller transmitting or receiving data using said external interface in response to said indication.

12. The container of claim 11 wherein said sensor generates an indication indicative of the presence or absence of light.

13. The container of claim 11 wherein said sensor includes a manual switch.

14. The container of claim 11 wherein said sensor is responsive to the opening of said enclosure.

15. The container of claim 6 further comprising a battery generating power for said controller and said display.

16. The container of claim 6 further comprising a switch and wherein said interface is responsive to said switch to effect the data exchange.

* * * * *

UNITED STATES PATENT AND TRADEMARK OFFICE
CERTIFICATE OF CORRECTION

PATENT NO.     : 6,762,734 B2                                                Page 1 of 1
DATED          : July 13, 2004
INVENTOR(S)    : Blotky, Randolph M.

It is certified that error appears in the above-identified patent and that said Letters Patent is hereby corrected as shown below:

<u>Title page,</u>
Insert Item -- [73] Assignee:  Time Warner Entertainment Co., L.P.
                               4000 Warner Blvd.
                               Burbank, CA 91522 --.

Signed and Sealed this

Sixth Day of September, 2005

JON W. DUDAS
*Director of the United States Patent and Trademark Office*